(12) United States Patent
Shih et al.

(10) Patent No.: US 8,810,526 B2
(45) Date of Patent: Aug. 19, 2014

(54) TOUCH APPARATUS AND DRIVING METHOD

(75) Inventors: Po-Sheng Shih, Miao-Li County (TW); Po-Yang Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 783 days.

(21) Appl. No.: 12/970,868

(22) Filed: Dec. 16, 2010

(65) Prior Publication Data

US 2011/0148790 A1 Jun. 23, 2011

(30) Foreign Application Priority Data

Dec. 18, 2009 (CN) .......................... 2009 1 0311811

(51) Int. Cl.
*G06F 3/041* (2006.01)

(52) U.S. Cl.
USPC ........... 345/173; 345/175; 345/176; 345/204; 345/214; 178/18.01; 178/18.06; 156/272.8; 156/275.5; 341/20

(58) Field of Classification Search
USPC ............... 345/173–176, 204, 214; 178/18.01, 178/18.06; 341/20; 156/272.8, 275.5
See application file for complete search history.

(56) References Cited

U.S. PATENT DOCUMENTS

| | | | |
|---|---|---|---|
| 5,335,023 A * | 8/1994 | Edwards | 348/800 |
| 5,451,724 A | 9/1995 | Nakazawa et al. | |
| 6,239,788 B1 * | 5/2001 | Nohno et al. | 345/173 |
| 6,278,444 B1 * | 8/2001 | Wilson et al. | 345/173 |
| 8,552,989 B2 * | 10/2013 | Hotelling et al. | 345/173 |
| 2008/0006453 A1 | 1/2008 | Hotelling | |
| 2008/0231791 A1 | 9/2008 | Tanabe et al. | |
| 2009/0096757 A1 * | 4/2009 | Hotelling et al. | 345/173 |
| 2009/0127003 A1 * | 5/2009 | Geaghan | 178/18.03 |

* cited by examiner

*Primary Examiner* — Shaheda Abdin
(74) *Attorney, Agent, or Firm* — Bacon & Thomas, PLLC (57) ABSTRACT

A touch apparatus includes a touch panel, voltage storage elements, a voltage supply unit, and a processing unit. The touch panel has electrodes respectively coupled to the voltage storage elements. When the voltage supply unit does not provide the voltage to the voltage storage element, the voltage storage element achieves a voltage balance within an energy storage time and stores a voltage of the corresponding electrode. The energy storage times of a part of the voltage storage elements at least partially overlap. The energy storage times of two the voltage storage elements respectively coupled to two adjacent electrodes do not overlap with each other. The processing unit is coupled to the electrodes and the voltage storage elements and adopts voltages stored in the voltage storage elements when the voltage balance is achieved.

15 Claims, 8 Drawing Sheets

TOUCH APPARATUS AND DRIVING METHOD

BACKGROUND

1. Technical Field

The disclosure generally relates to a driving technology, and more particularly, to a touch apparatus capable of increasing the scanning speed and a driving method thereof.

2. Description of Related Art

In recent years, touch panels have been extensively applied to various electronic products, such as global positioning systems (GPSs), personal digital assistants (PDAs), cellular phones, hand-held PCs, and so on, to replace conventional input apparatuses, such as keyboards, mice, and so on. Generally, touch panels sense users' touch through driving apparatuses thereof, and output coordinates to electronic apparatuses according to touch positions or directly perform corresponding operations according to touch positions.

Generally, there are a plurality of electrodes and conductive films on touch panels of typical touch apparatuses, and the electrodes are connected to the conductive films to output voltages of the conductive films. The typical touch apparatuses sequentially read the voltages outputted by the electrodes so as to calculate contact points through the voltages. Besides, the typical touch apparatuses read the voltages outputted by one of the electrodes, and then read the voltages outputted by the next one after calculation. When the typical touch apparatuses read the voltages outputted by one of the electrodes, the voltages may be changed due to the touch action. Accordingly, the typical touch apparatuses would calculate the contact points after the voltages are stable to avoid reading errors. However, based on the development trend of touch panels, such as larger panel sizes, smaller panel frames, or better optical performance, the voltage conversion time of the touch panels, i.e. the stabilizing time of the voltages, is increased. The increase of the voltage conversion time affects the speed of the touch apparatuses sensing the touch panels, and the decrease of the sensing speed affects the fluency of sensing contact points and the accuracy of the calculation.

SUMMARY

An embodiment of the disclosure provides a touch apparatus including a touch panel, a plurality of voltage storage elements, a voltage supply unit, and a processing unit. The touch panel has a plurality of electrodes. The voltage storage elements are respectively coupled to the electrodes. The voltage supply unit is coupled to the electrodes and adapted to respectively provide and respectively not to provide a first voltage to the electrodes. When the voltage supply unit does not provide the first voltage to the voltage storage element, the voltage storage element is adapted to achieve a voltage balance within an energy storage time and store a second voltage of the corresponding electrode. The energy storage times of a part of the voltage storage elements at least partially overlap, and the energy storage times of two of the voltage storage element respectively coupled to two adjacent electrodes of the electrodes do not overlap with each other. The processing unit is coupled to the electrodes and the voltage storage elements and adapted to adopt the second voltages stored in the voltage storage elements when the voltage balance is achieved.

Another embodiment of the disclosure provides a driving method adapted to drive a touch apparatus. The driving method includes following steps. A first voltage is respectively provided and respectively not provided to a plurality of electrodes of the touch apparatus, wherein the electrodes are coupled to a plurality of voltage storage elements of the touch apparatus. When the first voltage is not provided to the electrode, a second voltage of the electrode and the voltage storage element achieves a voltage balance within an energy storage time, wherein the energy storage times of a first part of the voltage storage elements at least partially overlap, and the energy storage times of two voltage storage elements respectively coupled to two adjacent electrodes do not overlap with each other. The second voltages stored in the voltage storage elements are adopted when the voltage balance is achieved.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
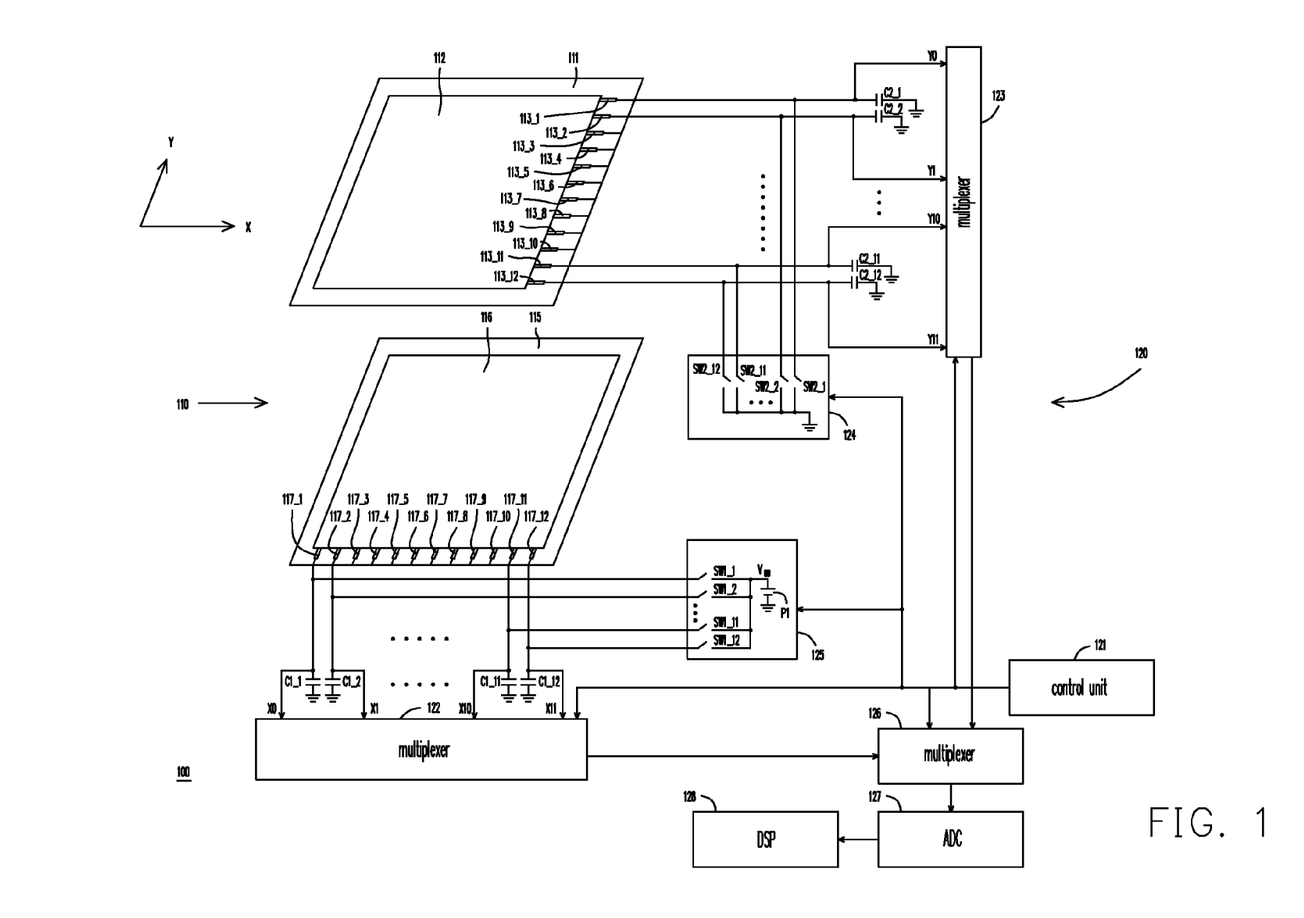
FIG. 1 is a circuit diagram of a touch apparatus according to an embodiment of the disclosure.

FIG. 1 is a circuit diagram of a touch apparatus according to an embodiment of the disclosure. Referring to FIG. 1, the touch apparatus 100 includes a touch panel 110 and a peripheral circuit 120. In the present embodiment, the touch panel 110, for example, is a carbon nanotube (CNT) touch panel. However, in other embodiments, the touch panel 110 may also be a capacitive touch panel or a resistive touch panel. The touch panel 110 includes an upper substrate 111 and a lower substrate 115. A transparent conductive film 112 covers the surface of the upper substrate 111 facing to the lower substrate 115, and a transparent conductive film 116 covers the surface of the lower substrate 115 facing to the upper substrate 111. Herein, the transparent conductive films 112 and 116 are anisotropic conductive films. In the present embodiment, the main conductive direction, e.g. X-direction, of the transparent conductive film 112 is substantially perpendicular to the main conductive direction, e.g. Y-direction, of the transparent conductive film 116. Electrodes 113_1~113_12 are disposed on the upper substrate 111, and electrodes 117_1~117_12 are disposed on the lower substrate 115, wherein the electrodes 113_1~113_12 are connected to the transparent conductive film 112, and the disposing direction of the electrodes 113_1~113_12 is perpendicular to the main conductive direction of the transparent conductive film 112. In addition, the electrodes 117_1~117_12 are connected to the transparent conductive film 116, and the disposing direction of the electrodes 117_1~117_12 is perpendicular to the main conductive direction of the transparent conductive film 116.

The peripheral circuit 120 includes a control unit 121, multiplexers 122, 123, and 126, voltage supply units 124 and 125, an analog-to-digital converter (ADC) 127, a digital signal processor (DSP) 128, and capacitors, i.e. voltage storage elements, C1_1~C1_12 and C2_1~C2_12, wherein the multiplexers 122, 123, and 126, for example, are analogical multiplexers. The capacitor C1_1~C1_12 are respectively coupled between the electrodes 117_1~117_12 and the ground, and the capacitor C2_1~C2_12 are respectively coupled between the electrodes 113_1~113_12 and the ground, wherein the capacitor C1_1~C1_12 may be physical capacitors between the electrodes 117_1~117_12 and the ground, and the capacitor C2_1~C2_12 may be physical capacitors between the electrodes 113_1~113_12 and the ground. The capacitor C1_1~C1_12 are coupled between the multiplexer 122 and the ground, and the capacitor C2_1~C2_12 are coupled between the multiplexer 123 and the ground. The voltage supply units 124 is coupled to the electrodes 113_1~113_12, and the voltage supply units 125 is coupled to the electrodes 117_1~117_12. The multiplexer 122 is coupled to the electrodes 117_1~117_12 and the capacitors C1_1~C1_12, and the multiplexer 123 is coupled to the electrodes 113_1~113_12 and the capacitors C2_1~C2_12. The multiplexer 126 is coupled to the multiplexers 122 and 123 and the ADC 127. The ADC 127 is coupled to the DSP 128. Herein, the multiplexers 122, 123, and 126, the voltage supply units 124 and 125, the ADC 127, the control unit 121, and the DSP 128 may be deemed as a processing unit.

Before the touch panel 110 is detected, the voltage supply unit 124 is controlled by the control unit 121 to provide the ground voltage to the electrodes 113_1~113_12 and the capacitors C2_1~C2_12, and the voltage supply unit 125 is controlled by the control unit 121 to provide the voltage $V_{DD}$ to the electrodes 117_1~117_12 and the capacitors C1_1~C1_12. The voltage supply units 124 may include switches SW2_1~SW2_12. The switches SW2_1~SW2_12 are respectively coupled between the electrodes 113_1~113_12 and the ground. The voltage supply units 125 may include switches SW1_1~SW1_12. The switches SW1_1~SW1_12 are respectively coupled between the electrodes 117_1~117_12 and a bias voltage source P1. In other words, the switches SW2_1~SW2_12 are controlled by the control unit 121 to be conducted to provide the ground voltage to the electrodes 113_1~113_12. Similarly, the switches SW1_1~SW1_12 are also controlled by the control unit 121 to be conducted to provide the voltage $V_{DD}$ of the bias voltage source P1 to the electrodes 117_1~117_12.

When the touch panel 110 is detected, the voltage supply units 124 and 125 are controlled by the control unit 121 not to provide the voltage $V_{DD}$ or the ground voltage to the electrodes under detecting. For example, if the electrode 117_1 of the touch panel 110 is detected, the switch SW1_1 is controlled by the control unit 121 not to be conducted to stop providing the voltage $V_{DD}$ to the electrode 117_1. Furthermore, due to the capacitor C1_1, the voltage of the electrode 117_1 is still maintained. That is, when the contact point does not correspond to the position of the electrode 117_1, the voltage of the electrode 117_1 is about maintained at the voltage $V_{DD}$. If the contact point corresponds to the position of the electrode 117_1, the electrode 117_1 is electrically connected to one of the electrodes 113_1~113_12 by the touch of the transparent conductive films 112 and 116.

Because the voltages of the electrodes 113_1~113_12 are the ground voltage, the capacitor C1_1 thereby discharges, such that the voltage of the electrode 117_1 starts to decrease. Furthermore, when the voltage of the electrode 117_1 decreases to a stable voltage such as a voltage between the voltage $V_{DD}$ and the ground voltage, the capacitor C1_1 achieves to a voltage balance. Next, the multiplexer 122 reads the voltage of the capacitor C1_1 to serve as the detecting voltage X0 and transmits it to the multiplexer 126. Next, the multiplexer 126 is also controlled by the control unit 121 to transmit the detecting voltage X0 to the ADC 127, such that the ADC 127 converts the detecting voltage X0 into a digital signal and transmits it to the DSP 128.

The touch apparatus 100 repeatedly performs the foregoing operation on the electrodes 113_1~113_12 and 117_2~117_12 to detect whether the contact point corresponds to the positions of the electrodes 113_1~113_12 and 117_2~117_12. When the electrodes 113_1~113_12 are detected, the voltages of the electrodes 117_2~117_12 are greater than those of the electrodes 113_1~113_12. Accordingly, when the contact point corresponds to the positions of the electrodes 113_1~113_12, the voltages of the capacitors C2_1~C2_12 is charged, and after the voltages of the capacitors C2_1~C2_12 achieve the voltage balance, the voltages serve as the detecting voltages Y0~Y11. After the electrodes 113_1~113_12 and 117_2~117_12 are detected, the multiplexers 122 and 123 sequentially output the detecting voltages X1~X11 and Y0~Y11 to the multiplexer 126. Next, the multiplexer 126 sequentially transmits the detecting voltages X1~X11 and Y0~Y11 to the ADC 127 to convert the detecting voltages X1~X11 and Y0~Y11 into the digital signals. After receiving the digital signals converted from the detecting voltages X1~X11 and Y0~Y11, the DSP 128 performs an operation on the digital signals corresponding to the detecting voltages X1~X11 to obtain the X-axis position corresponding to the contact point, and further performs the operation on the digital signals corresponding to the detecting voltages Y0~Y11 to obtain the Y-axis position corresponding to the contact point.

Figure 2:
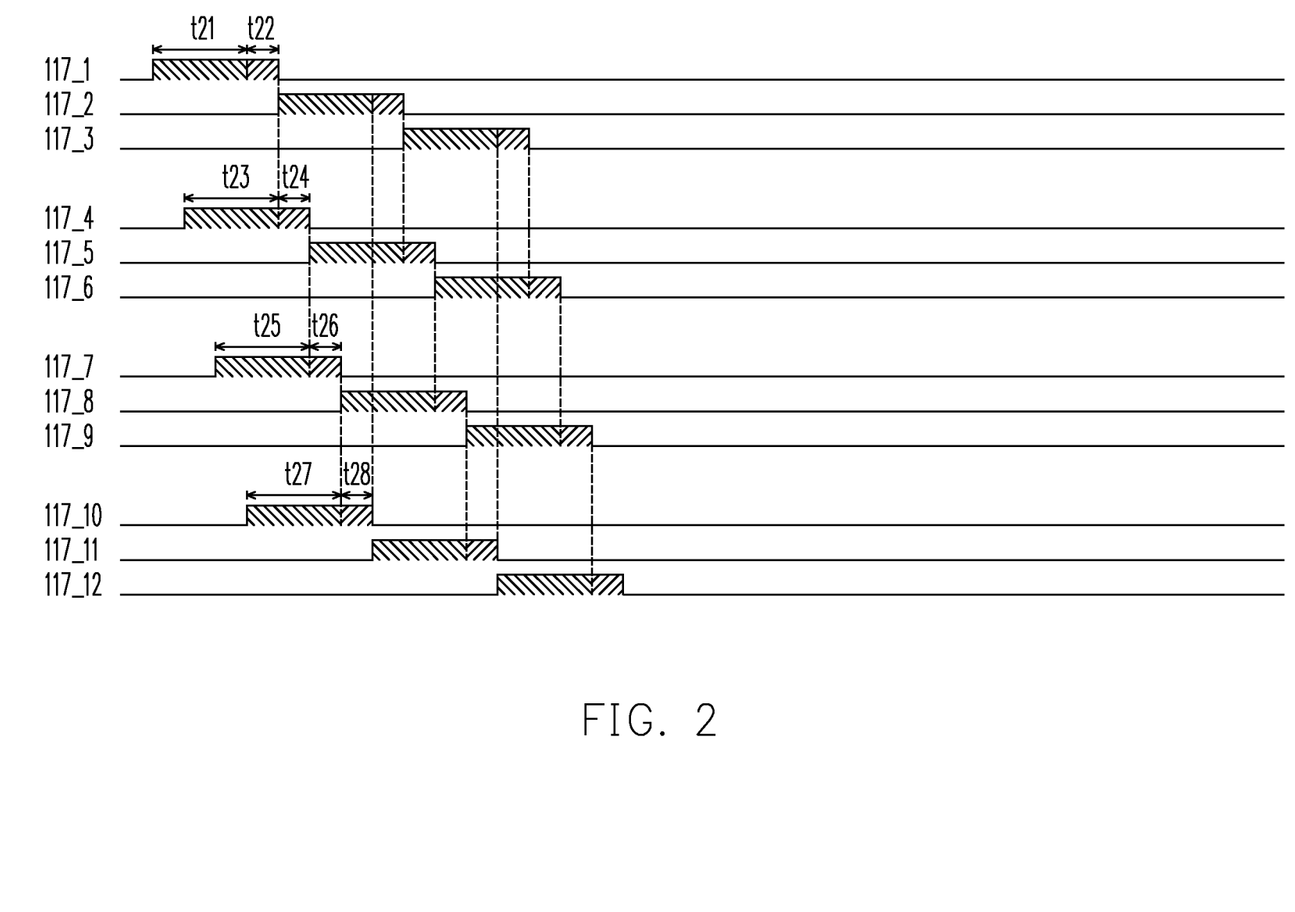
FIG. 2 is a driving timing diagram of the touch apparatus of FIG. 1.

FIG. 2 is a driving timing diagram of the touch apparatus of FIG. 1. Referring to FIG. 1 and FIG. 2, the driving timing of the electrodes 117_1~117_12 are exemplary herein, and the driving timing of the electrodes 113_1~113_12 can be taught or suggested by referring that of the electrodes 117_1~117_12. Before the time t21, the voltage supply unit 125 provides the voltage $V_{DD}$ to the electrodes 117_1~117_12 and the capacitors C1_1~C1_12. During the time t21, the switch SW1_1 is not conducted, such that the voltage of the capacitor C1_1 can achieve the voltage balance to detect the electrode 117_1, wherein the time t21 can be deemed as the energy storage time of the capacitor C1_1 coupled to the electrode 117_1.

Next, during the time t22, the detecting voltage X0 is transmitted to the ADC 127 by the multiplexers 122 and 126, and the detecting voltage X0 is converted into a digital signal. Herein, the operation during the times t23, t25, or t27 can refer to that during the time t21, and the operation during the times t24, t26, or t28 can refer to that during the time t22. Accordingly, the electrodes 117_4, 117_7, and 117_10 can be detected, and after the energy storage time, the voltages of the capacitors C1_4, C1_7, and C1_10 are sequentially adopted. The driving timing of the other electrodes can refer to the foregoing description, and it will not be described again. It should be noted that, the times t21, t23, t25, and t27 overlap, and the times t22, t24, t26, and t28 do not overlap. Furthermore, the energy storage times of the capacitors such as C1_1 and C1_2 coupled to the adjacent electrodes such as 117_1 and 117_2 do not overlap with each other.

Figure 3:
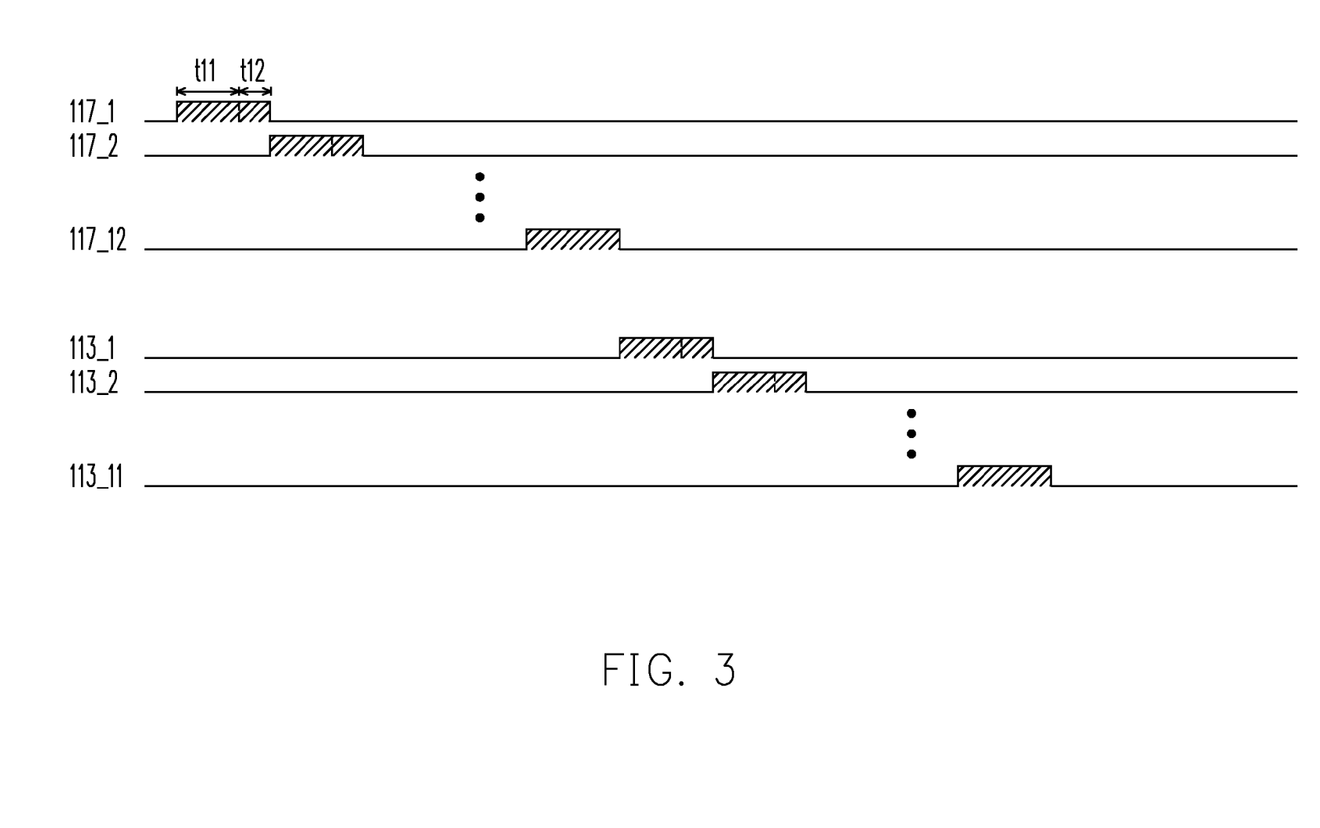
FIG. 3 is a driving timing diagram of another touch apparatus compared with the touch apparatus of FIG. 1.

FIG. 3 is a driving timing diagram of another touch apparatus compared with the touch apparatus of FIG. 1. Referring to FIG. 2 and FIG. 3, in FIG. 3, the operation during the time t11 can refer to that during the time t21, and the operation during the time t12 can refer to that during the time t22. Furthermore, the electrodes 117_1~117_12 are sequentially detected, and the detecting times of the electrodes 117_1~117_12 do not overlap with each other. Accordingly, compared with those of FIG. 3, the energy storage times of FIG. 2 partially overlap, such that the detecting time of the electrodes 117_1~117_12 can be decreased. In other words, for the driving timing of FIG. 2, the detecting time of the electrodes 117_1~117_12 are one time t21 and twelve times t22, and for the driving timing of FIG. 3, the detecting time of the electrodes 117_1~117_12 are twelve times t21 and twelve times t22. Furthermore, the time t21 is longer than the time t22, such that the detecting time of the electrodes 117_1~117_12 can be substantially decreased to increase the detecting speed of the electrodes 117_1~117_12.

Figure 4:
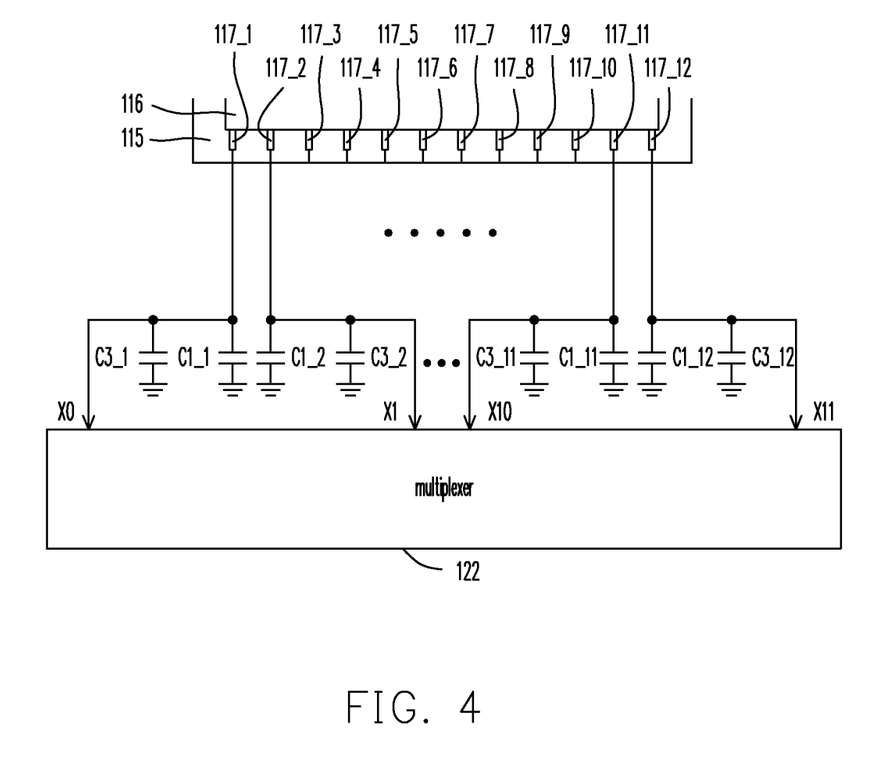
FIG. 4 is a part circuit diagram of a touch apparatus according to another embodiment of the disclosure.

FIG. 4 is a part circuit diagram of a touch apparatus according to another embodiment of the disclosure. A part of the circuit diagram is illustrated to describe the difference herein. Referring to FIG. 1 and FIG. 4, the difference therebetween is the capacitors C3_1~C3_12. The capacitors C3_1~C3_12 are respectively coupled to the capacitors C1_1~C1_12 in parallel. The capacitors C1_1~C1_12 are physical capacitors, and the capacitors C3_1~C3_12 are parasitical capacitors. In other embodiments, the physical capacitors may be unnecessary, and instead the parasitical capacitors are adopted only. The parasitical capacitors includes parasitical capacitors between the transparent conductive films 112 and 116 or parasitical capacitors between the electrodes 117_1~117_12 and the ground. Furthermore, the circuit between the electrodes 113_1~113_12 and the multiplexer 123 can be correspondingly modified by referring to the foregoing description in the present embodiment, and it will not be described again herein.

Figure 5:
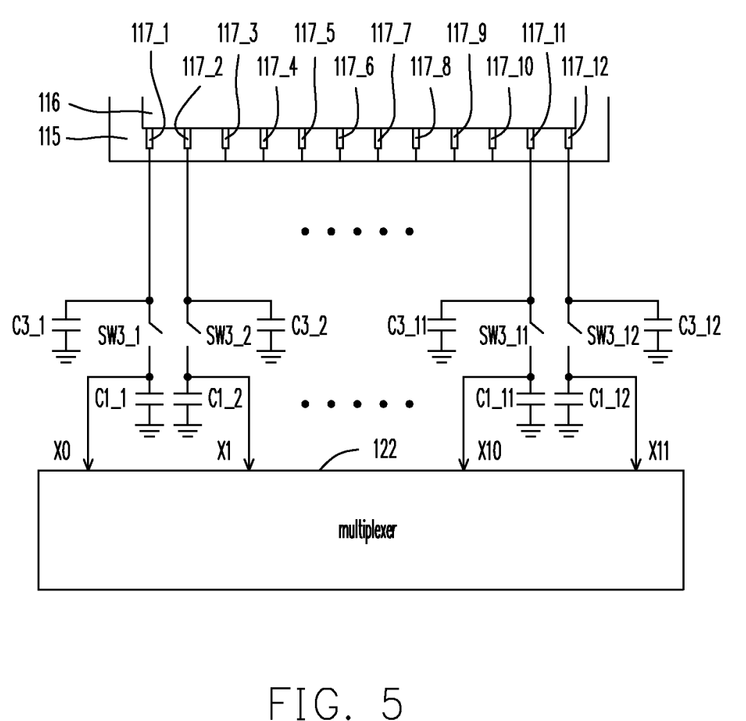
FIG. 5 is a part circuit diagram of a touch apparatus according to another embodiment of the disclosure.

FIG. 5 is a part circuit diagram of a touch apparatus according to another embodiment of the disclosure. A part of the circuit diagram is illustrated herein, and the other part not illustrated can refer to FIG. 1. It will not be described again herein. Referring to FIG. 5 and FIG. 4, the difference therebetween is the switches SW3_1~SW3_12. The switches SW3_1~SW3_12 are respectively coupled between the electrodes 117_1~117_12 and the capacitors C1_1~C1_12 and controlled by the control unit 121 to be conducted or not conducted. In the present embodiment, the capacitors C3_1~C3_12 may be the foregoing parasitical capacitors. Furthermore, the circuit between the electrodes 113_1~113_12 and the multiplexer 123 can be correspondingly modified by referring to the foregoing description in the present embodiment.

Figure 6:
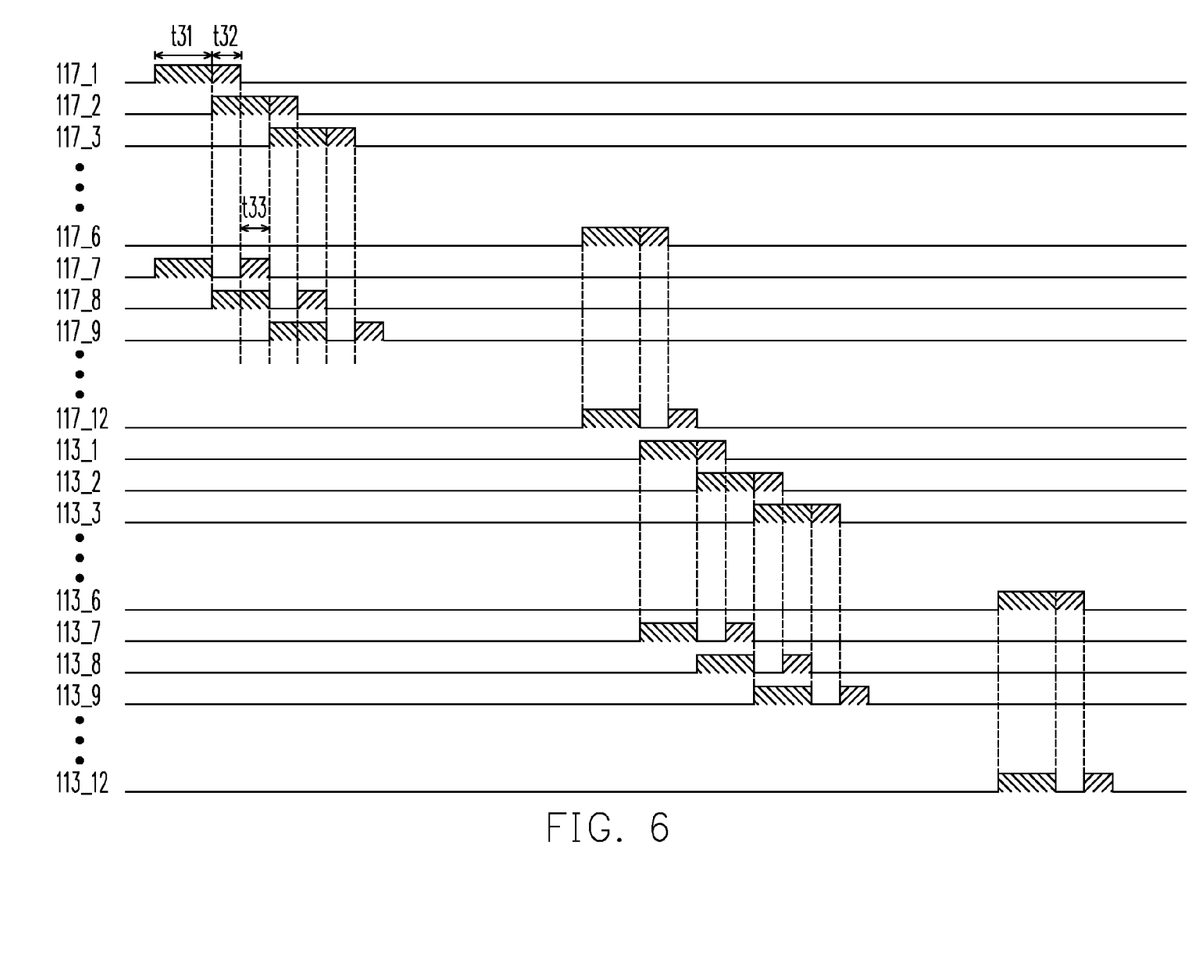
FIG. 6 is a driving timing diagram of the touch apparatus of FIG. 5.

FIG. 6 is a driving timing diagram of the touch apparatus of FIG. 5. Referring to FIG. 1, FIG. 5, and FIG. 6, during the time t31, the switches SW1_2~SW1_6 and SW1_8~SW1_12 are conducted, and the switches SW1_1 and SW1_7 are not conducted, such that the voltage $V_{DD}$ is not provided to the electrodes 117_1 and 117_7 and the capacitors C1_1, C1_7, C3_1, and C3_7. When the contact point corresponds to the position of the electrode 117_1 or 117_7, the voltages of the capacitors C1_1 and C1_7 or C3_1 and C3_7 may change, or the voltages of the capacitors C1_1 and C1_7 or C3_1 and C3_7 are substantially maintained at the voltage $V_{DD}$. Herein, the time t31 can be deemed as the energy storage times of the capacitors C1_1 and C1_7.

During the time t32, the multiplexer 122 adopts the voltage of the capacitor C1_1 to serve as the detecting voltage X0. At this time, the switch SW3_1 is not conducted to cut off the connection of the capacitor C1_1 and the electrode 117_1, and the switch SW1_1 is conducted to provide the voltage $V_{DD}$ to the capacitor C3_1 and the electrode 117_1. Furthermore, the switch SW3_7 is not conducted to cut off the connection of the capacitor C1_7 and the electrode 117_7, and the switch SW1_7 is conducted to provide the voltage $V_{DD}$ to the capacitor C3_7 and the electrode 117_7. During the time t33, the multiplexer 122 adopts the voltage of the capacitor C1_7 to serve as the detecting voltage X6, and the switch SW3_1 is conducted to connect the capacitor C1_1 and the electrode 117_1 because the electrode 117_1 has been detected. In other words, the voltage of the capacitor C1_1 is adopted by the multiplexer 122 after the time t31, and the voltage of the capacitor C1_7 is simply adopted by the multiplexer 122 after the time t31 and a time interval t32. After the time t33, the switch SW3_7 is conducted to connect the capacitor C1_7 and the electrode 117_7 because the electrode 117_7 has been detected. Accordingly, the energy storage times of the capacitors C1_1 and C1_7 completely coincide, and the energy storage times of the capacitors C1_2 and C1_8 also completely coincide. The other energy storage times of the capacitors can refer to FIG. 6. Furthermore, the multiplexer 122 adopts the voltages of the capacitors C1_1~C1_12 to serve as the detecting voltages X0~X11.

In addition, when the switches SW3_1 and SW3_7 are not conducted, i.e. during the times t32 and t33, the capacitors C1_1 and C1_7 are not affected by the voltages of the electrodes 117_1 and 117_7. Accordingly, the voltage supply units 125 can provide the voltage $V_{DD}$ to the electrodes 117_1 and 117_7 again. Furthermore, the switches SW1_2 and SW1_8 can be not conducted, such that the electrodes 117_2 and 117_8 stay during the energy storage times. After the energy storage times correspond to the electrodes 117_2 and 117_8, the detecting voltages X1 and X7 are adopted according to the foregoing operation. The driving timing of the other electrodes can refer to the foregoing description, and it will not be described again here.

Figure 7:
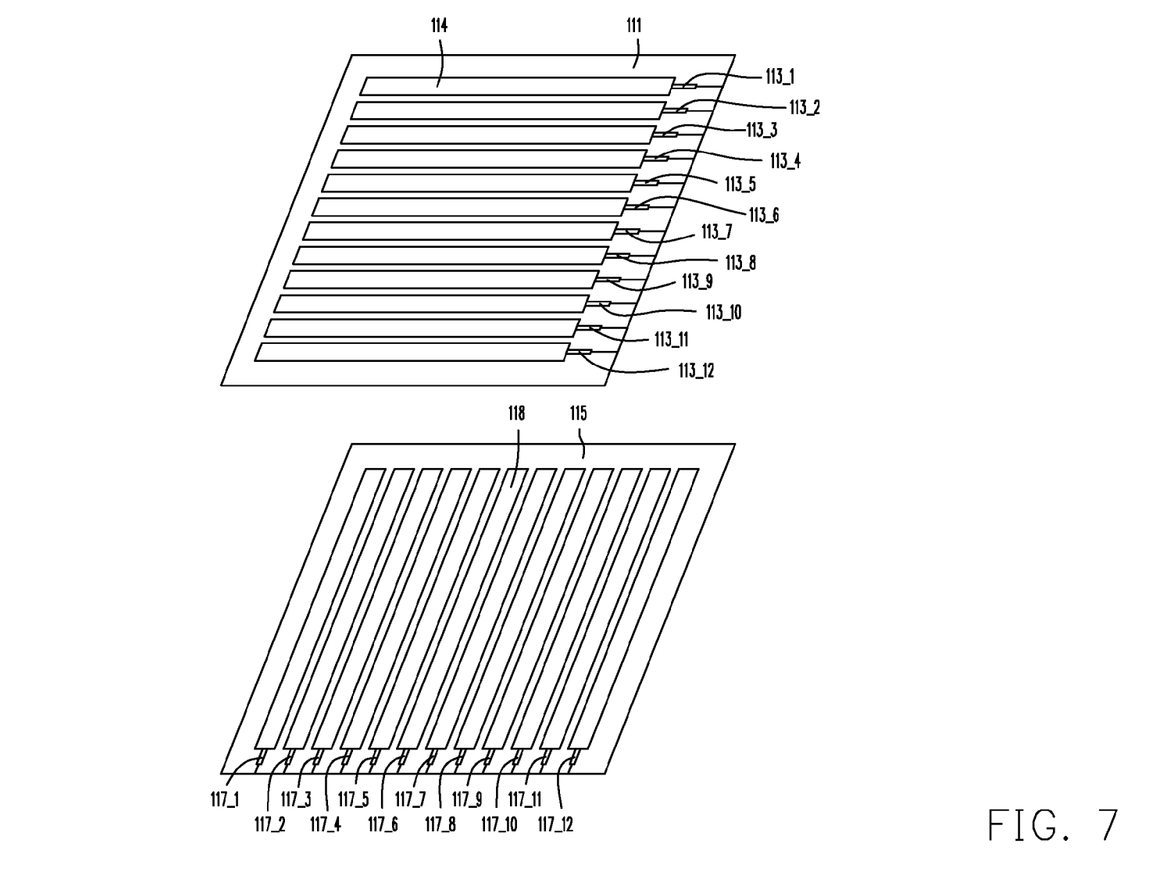
FIG. 7 is a schematic diagram of a touch panel of a touch apparatus according to an embodiment of the disclosure.

FIG. 7 is a schematic diagram of a touch panel of a touch apparatus according to an embodiment of the disclosure. Referring to FIG. 1 and FIG. 7, the touch apparatus of the present embodiment is similar to the foregoing touch apparatus 100, and the difference therebetween is described as below. In the present embodiment, the touch panel, for example, is a resistive touch panel. The surface of the upper substrate 111 facing to the lower substrate 115 and the surface different from the surface of the upper substrate 111 shown in FIG. 7 is covered with a plurality of transparent conductive lines 114, and the surface of the lower substrate 115 facing to the upper substrate 111 is covered with a plurality of transparent conductive lines 118, wherein each of the transparent conductive lines 114 is substantially perpendicular to each of the transparent conductive lines 118. The electrodes 113_1~113_12 of the upper substrate 111 are respectively connected to the transparent conductive lines 114, and the electrodes 117_1~117_12 of the lower substrate 115 are respectively connected to the transparent conductive lines 118.

It should be noted that, the drawing and description, such as the number of the electrodes and the driving timing, of the foregoing embodiments are exemplary, and it does not limit other embodiments of the disclosure. Furthermore, those skilled in the art can achieve the effect of overlapping the energy storage times to decrease the detecting time according to their design without departing from the scope or spirit of the disclosure after referring to the disclosure, so as to increase the detecting speed of the touch panel 110. In some embodiments, according to the design of the circuit, the multiplexer 126 is omitted or the multiplexers 122, 123, and 126 are integrated into a multiplexer.

Figure 8:
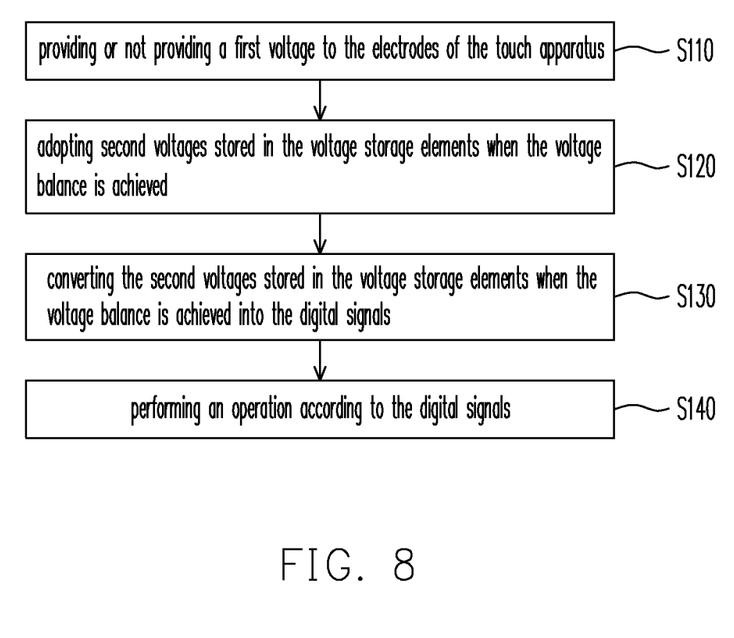
FIG. 8 is a flow chart of a driving method according to an embodiment of the disclosure.

Furthermore, based on the operation of the foregoing touch apparatus, a driving method is provided. FIG. 8 is a flow chart of a driving method according to an embodiment of the disclosure. Referring to FIG. 8, in step S110, a first voltage is provided or not provided to the electrodes of the touch apparatus. When the first voltage is not provided to the electrode, a second voltage of the electrode and the voltage storage element achieves a voltage balance within an energy storage time, and the second voltage is stored in the voltage storage element. Next, the second voltages stored in the voltage storage elements are adopted when the voltage balance is achieved (step S120). Thereafter, the second voltages stored in the voltage storage elements when the voltage balance is achieved are respectively converted into a plurality of digital signals (step S130), and then an operation is performed according to the digital signals to obtain the position of the contact point (step S140). Herein, the detail of each step can refer to the description of the foregoing apparatuses, and it will not be described again.

In summary, regarding the touch apparatuses and the driving method thereof in the embodiments of the disclosure, when the touch apparatuses are driven, the energy storage times of a part of the voltage storage elements partially overlap or completely coincide, and after the energy storage time or after a time interval, the voltages stored in the voltage storage elements are adopted. Accordingly, the detecting time of the touch panel can be decreased to increase the detecting speed of the touch apparatus.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A touch apparatus, comprising:
a touch panel including an upper substrate and a lower substrate, the upper and lower substrates respectively having a plurality of electrodes disposed thereon;
a plurality of voltage storage elements, each of the plurality of voltage storage elements coupled to each of the plurality of electrodes;
a voltage supply unit coupled to the plurality of electrodes and adapted to respectively provide and respectively not to provide a first voltage to the plurality of electrodes, wherein when the voltage supply unit does not provide the first voltage to the plurality of electrodes and one of the plurality of electrodes on the upper substrate electrically connects to one of the plurality of electrodes on the lower substrate, the voltage storage elements corresponding to the electrically connected electrodes are adapted to achieve a voltage balance within an energy storage time and store a second voltage of the electrically connected electrodes, the energy storage times of a part of the plurality of voltage storage elements at least partially overlap with each other, and the energy storage times of two of the plurality of voltage storage elements respectively coupled to two adjacent electrodes do not overlap with each other; and
a processing unit coupled to the plurality of electrodes and the voltage storage elements and adapted to adopt the second voltages stored in the voltage storage elements which correspond to the electrically connected electrodes when the voltage balance is achieved.

2. The touch apparatus as claimed in claim 1, wherein the voltage supply unit comprises a plurality of first switches respectively coupled between the plurality of electrodes and a bias voltage source, when the first switch is conducted, the bias voltage source provides the first voltage to the corresponding electrode, and when the first switch is not conducted, the bias voltage source does not provide the first voltage to the corresponding electrode.

3. The touch apparatus as claimed in claim 2, wherein the processing unit comprises:
a multiplexer coupled to the plurality of electrodes and the voltage storage elements;
an analog-to-digital converter coupled to the multiplexer, wherein the multiplexer is adapted to transmit the second voltages stored in the voltage storage elements after the energy storage time to the analog-to-digital converter, and the analog-to-digital converter is adapted to sequentially and respectively convert the second voltages into a plurality of digital signals; and
a digital signal processor coupled to the analog-to-digital converter and performing an operation according to the digital signals.

4. The touch apparatus as claimed in claim 1, further comprising:
a plurality of second switches respectively coupled between the plurality of electrodes and the corresponding voltage storage elements, wherein each of the second switches is switched off after the energy storage time of the corresponding voltage storage element.

5. The touch apparatus as claimed in claim 4, wherein the processing unit is adapted to respectively adopt the second voltages stored in the corresponding voltage storage elements after a time interval after at least a part of the second switches is switched off.

6. The touch apparatus as claimed in claim 1, further comprising a control unit controlling the voltage supply unit to provide and not to provide the first voltage to the plurality of electrodes and controlling a time point of the processing unit adopting the second voltages stored in the voltage storage elements.

7. The touch apparatus as claimed in claim 1, wherein each of the voltage storage elements comprises a parasitical capacitor coupled between the corresponding one of the plurality of electrodes and a ground, wherein the parasitical capacitor is coupled between the processing unit and the ground.

8. The touch apparatus as claimed in claim 1, wherein each of the voltage storage elements comprises a capacitor coupled between the corresponding one of the plurality of electrodes and a ground, wherein the capacitor is coupled between the processing unit and the ground.

9. The touch apparatus as claimed in claim 1, wherein the touch panel comprises a first conductive film and a second conductive film, and the plurality of electrodes are connected to at least one of the first conductive film and the second conductive film.

10. The touch apparatus as claimed in claim 9, wherein each of the first conductive film and the second conductive film is an anisotropic conductive film.

11. The touch apparatus as claimed in claim 1, wherein the touch panel is a resistive touch panel or a carbon nanotube touch panel.

12. A driving method, adapted to drive a touch apparatus, the driving method comprising:

respectively providing and respectively not providing a first voltage to a plurality of electrodes of the touch apparatus, wherein each of the plurality of electrodes is coupled to a plurality of voltage storage elements of the touch apparatus;

when the first voltage is not provided to the plurality of electrode and one of the plurality of electrodes on an upper substrate of the touch panel electrically connects to one of the plurality of electrodes on the lower substrate of the touch panel, letting the electrically connected electrodes and the voltage storage elements corresponding to the electrically connected electrodes achieve a voltage balance within an energy storage time and store a second voltage, wherein the energy storage times of a first part of the plurality of voltage storage elements at least partially overlap with each other, and the energy storage times of two of the plurality of voltage storage element respectively coupled to two adjacent electrodes do not overlap with each other; and adopting the second voltages stored in the voltage storage elements when the voltage balance is achieved;

converting the second voltage stored in the voltage storage elements when the voltage balance is achieved into a plurality of digital signals; and performing an operation according to the digital signals.

13. The driving method as claimed in claim 12, wherein the step of adopting the second voltage stored in the voltage storage elements when the voltage balance is achieved comprising:

after the corresponding energy storage time, adopting the second voltages stored in the voltage storage elements when the voltage balance is achieved.

14. The driving method as claimed in claim 12, wherein the step of adopting the second voltage stored in the voltage storage elements when the voltage balance is achieved comprising:

after the corresponding energy storage time, adopting the second voltage stored in a second part of the voltage storage elements when the voltage balance is achieved; and after a time interval after the corresponding energy storage time, adopting the second voltages stored in the second part of the voltage storage elements when the voltage balance is achieved.

15. The driving method as claimed in claim 12, wherein the step of respectively providing and respectively not providing the first voltage to the plurality of electrodes of the touch apparatus comprises:

within the energy storage time of the voltage storage element corresponding to each of the plurality of electrodes, not providing the first voltage to the electrode; and except the energy storage time of the voltage storage element corresponding to each of the plurality of electrodes, providing the first voltage to the electrode.

* * * * *